United States Patent
Ge et al.

(10) Patent No.: US 11,500,969 B2
(45) Date of Patent: Nov. 15, 2022

(54) PROTECTING COMMERCIAL OFF-THE-SHELF PROGRAM BINARIES FROM PIRACY USING HARDWARE ENCLAVES

(71) Applicant: Microsoft Technology Licensing, LLC, Redmond, WA (US)

(72) Inventors: Xinyang Ge, Redmond, WA (US); Weidong Cui, Redmond, WA (US); Ben Niu, Bellevue, WA (US); Ling Tony Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 16/734,197

(22) Filed: Jan. 3, 2020

(65) Prior Publication Data
US 2021/0209201 A1    Jul. 8, 2021

(51) Int. Cl.
*G06F 21/12* (2013.01)
*G06F 21/44* (2013.01)
*H04L 9/08* (2006.01)
*H04L 9/32* (2006.01)

(52) U.S. Cl.
CPC ............ *G06F 21/125* (2013.01); *G06F 21/44* (2013.01); *H04L 9/0819* (2013.01); *H04L 9/3236* (2013.01); *G06F 2221/0753* (2013.01)

(58) Field of Classification Search
CPC .................. G06F 21/125; G06F 21/44; G06F 2221/0753; H04L 9/0819; H04L 9/3236
USPC .......................................................... 713/190
See application file for complete search history.

(56) References Cited

U.S. PATENT DOCUMENTS

| 10,462,135 | B2* | 10/2019 | Varadarajan | ........ H04L 63/0428 |
| 2002/0083318 | A1* | 6/2002 | Larose | .................. G06F 21/602 713/164 |
| 2007/0192864 | A1 | 8/2007 | Bryant et al. | |
| 2014/0215225 | A1* | 7/2014 | Koliesnik | ............... G06F 21/14 713/190 |
| 2015/0199514 | A1* | 7/2015 | Tosa | ...................... G06F 21/554 726/17 |

(Continued)

OTHER PUBLICATIONS

"International Search Report and Written Opinion Issued in PCT Application No. PCT/US20/060811", dated Mar. 4, 2021, 11 Pages.

*Primary Examiner* — Bryan F Wright
(74) *Attorney, Agent, or Firm* — Ray Quinnney & Nebeker P.C.; Adam K. Richards

(57) ABSTRACT

This disclosure describes systems and methods for protecting commercial off-the-shelf software program code from piracy. A software program may include multiple image files having code and data. A platform may modify the executable file such that the data may be placed at a location in memory that is an arbitrary distance from the code. The platform may encrypt the code and provide it to a computing device comprising a hardware enclave. The computing device may load the encrypted code into the hardware enclave but load the data into memory outside the hardware enclave. The computing device may request a decryption key from an authentication server using a hash of the hardware enclave signed by a processor. The authentication server may provide the decryption key if it verifies the signature and the hash. The computing device may decrypt the code and mark the hardware enclave as non-readable.

20 Claims, 7 Drawing Sheets

(56) References Cited

U.S. PATENT DOCUMENTS

| | | | |
|---|---|---|---|
| 2016/0188350 A1* | 6/2016 | Shah | G09C 1/00 |
| | | | 717/148 |
| 2018/0165428 A1 | 6/2018 | Miller et al. | |
| 2019/0114401 A1* | 4/2019 | De | G06F 21/14 |
| 2019/0180006 A1 | 6/2019 | Bojjireddy et al. | |

* cited by examiner

PROTECTING COMMERCIAL OFF-THE-SHELF PROGRAM BINARIES FROM PIRACY USING HARDWARE ENCLAVES

CROSS-REFERENCE TO RELATED APPLICATIONS

N/A

BACKGROUND

Computing devices may be used to perform a wide variety of tasks. Software developers may design and create software programs for use on computing devices. Users of computing devices may use software applications to perform tasks. For example, a user of a computing device may use an internet browser application to access information on the internet and then use a presentation application to create a presentation communicating information obtained from the internet. Software applications may include a number of different files, including executable files.

Software developers may worry about software piracy. Software piracy may occur when an end user purchases or obtains a copy of an application, makes unauthorized copies of the application, and uses the unauthorized copies or distributes them to third parties. Stopping piracy may be difficult because the attacker often has full control of the computing device and system that runs the application.

SUMMARY

In accordance with one aspect of the present disclosure, a method is disclosed for protecting software from piracy. The method includes receiving multiple binary files. Each binary file includes code and data. The method further includes modifying the multiple binary files such that the data of each binary file may be located at an arbitrary distance in memory from the code of that binary file. The method further includes encrypting the code of each binary file. The method further includes receiving, from a computing device, a request for a decryption key. The computing device may include a hardware enclave. The encrypted code of each binary file but not the data of each binary file may be stored in the hardware enclave.

The method may further include providing, to the computing device, the decryption key.

The method may further include authenticating, before providing the decryption key, a processor signature. A processor of the computing device generated the processor signature and the request for the decryption key may include the processor signature.

The method may further include validating, before providing the decryption key, a hash. The request for the decryption key may include the hash.

Modifying the multiple binary files may include identifying data references in the code of each binary file and modifying the data references.

Modifying the multiple binary files may be done without access to source code or debug symbols for the multiple binary files.

The method may further include adding a separation header to each of the multiple binary files. The separation header may indicate that the data of each of the multiple binary files may be placed at an arbitrary distance in the memory from the code of that binary file.

In accordance with another aspect of the present disclosure, a system is disclosed for facilitating protecting a software program from piracy. The system includes one or more processors, memory in electronic communication with the one or more processors, and instructions stored in the memory. The instructions are executable by the one or more processors to receive multiple binary files, each binary file comprising code and data. The instructions are also executable by the one or more processors to modify the multiple binary files such that the data of each binary file may be located at an arbitrary distance in memory from the code of that binary file. The instructions are also executable by the one or more processors to encrypt the code of each binary file but not the data of each binary file. The instructions are also executable by the one or more processors to receive, from a computing device, a request for a decryption key. The computing device includes a hardware enclave. The encrypted code of each binary file but not the data of each binary file is stored in the hardware enclave. The hardware enclave includes instructions to mark the hardware enclave as non-readable before executing the code.

The instructions may be further executable by the one or more processors to provide, to the computing device, the decryption key.

The instructions may be further executable by the one or more processors to authenticate, before providing the decryption key, a processor signature. A processor of the computing device generated the processor signature and the request for the decryption key may include the processor signature.

The instructions may be further executable by the one or more processors to validate, before providing the decryption key, a hash. The request for the decryption key may include the hash and validating the hash may include comparing the hash to a verified hash value.

Modifying the multiple binary files may include identifying data references in the code of each binary files and modifying the data references.

Modifying the multiple binary files may not require access to source code or debug symbols for the multiple binary files.

The instructions may be further executable by the one or more processors to add a separation header to each of the multiple binary files. The separation header may indicate that the data of each of the multiple binary files may be placed at an arbitrary distance in the memory from the code of that binary file and that the code of that binary file should be placed in the hardware enclave.

In accordance with another aspect of the present disclosure, a computer-readable medium is disclosed. The computer-readable medium includes instructions that are executable by one or more processors to cause a computing system to receive a request to initiate an application, the application including one or more files with executable code and data. The executable code is encrypted. The instructions are also executable by one or more processors to cause a computing system to load the executable code into a hardware enclave on the computing system and load the data into a location in memory on the computing system. The location is outside the hardware enclave and is not a predetermined distance in the memory from the executable code. The instructions are also executable by one or more processors to cause a computing system to send a request for a decryption key to an authentication server and decrypt the executable code using the decryption key. The decryption key is received by the computing system after sending the request for the decryption key. The instructions are also executable by one or more processors to cause a computing system to mark the hardware enclave as non-readable.

The executable code may include two or more sections of executable code and the two or more sections of executable code may be loaded in a continuous range in the hardware enclave.

The computer-readable medium may further include additional instructions that are executable by the one or more processors to cause the computing system to load startup code into the hardware enclave.

The computer-readable medium may further include additional instructions that are executable by the one or more processors to cause the computing system to measure a hash of the startup code and the executable code.

The computer-readable medium may further include additional instructions that are executable by the one or more processors to cause the computing system to sign the hash with a signature of the one or more processors.

The request for the decryption key may include the signature and the hash.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
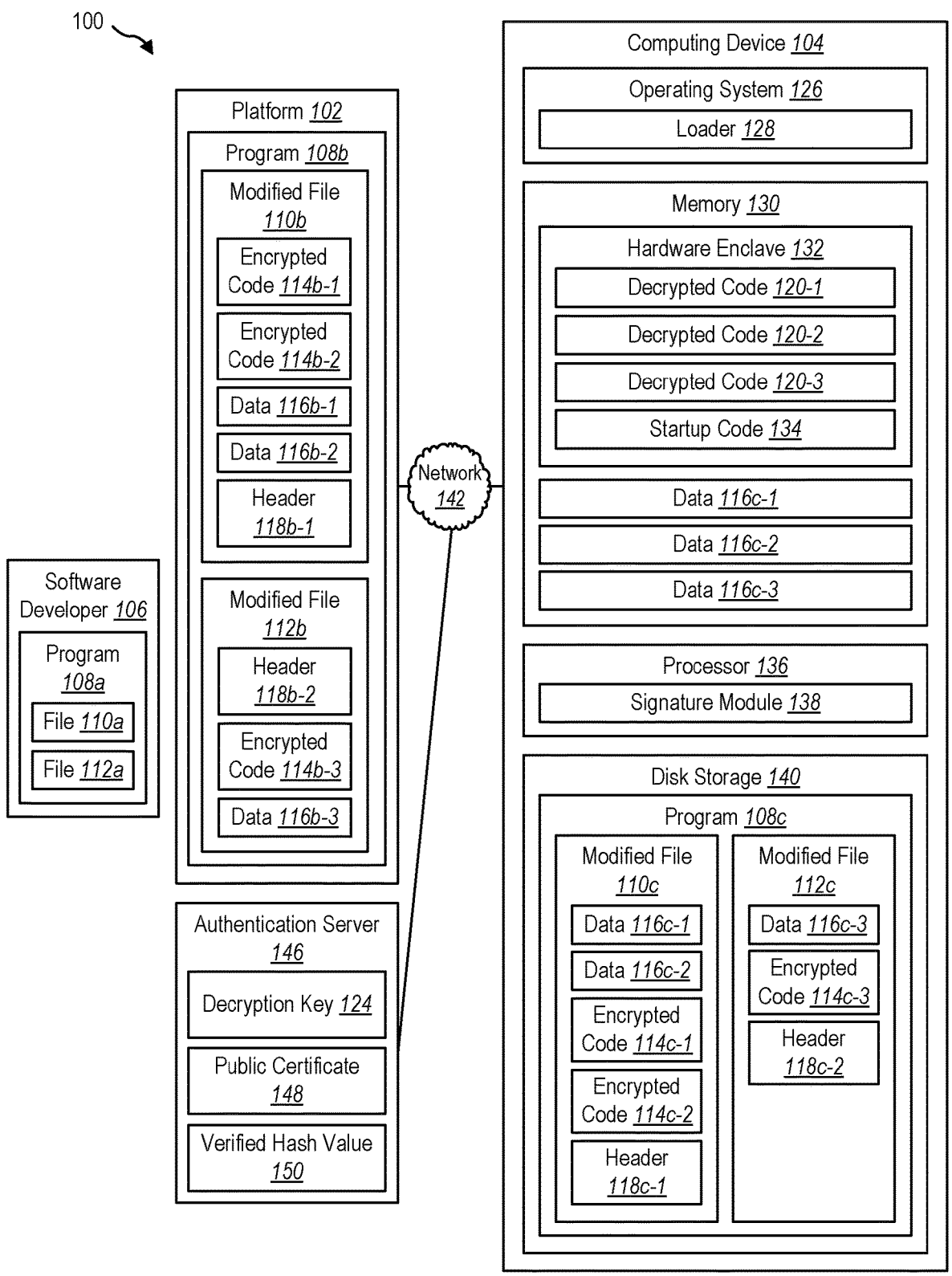
FIG. 1 illustrates an example system for utilizing a hardware enclave to protect a software program from software piracy.

A software developer may create an application for use on computing devices. The application may include sets of instructions that cause computing devices to perform certain tasks. The software developer may invest significant time and money into designing and creating the application's code. The software developer may intend to profit from sales (by the software developer or a distributor) of authorized copies of the application. As a result, the software developer may want to protect the application from piracy. Software piracy may occur when a user purchases or obtains a copy of the application, makes unauthorized copies of the application, and uses the unauthorized copies or distributes them to third parties. The third parties may use the unauthorized copies of the application instead of purchasing an authorized copy from the software developer or the software developer's distributor. Thus, software piracy may directly impact the developer's revenues and profits. Stopping piracy, however, may be difficult because the attacker often has full control of the system that runs the application.

This disclosure describes systems and methods for utilizing hardware enclaves to protect program code contained in commercial off-the-shelf (COTS) programs from software piracy. A hardware enclave may be a defined region of memory whose contents cannot be read or saved by any software, including the operating system and even hypervisor, not stored in the hardware enclave. A set of instruction codes, such as Intel® Software Guard Extensions (Intel® SGX) or AMD Secure Encrypted Virtualization (SEV), built into a processor may support creation and use of the hardware enclave. The set of instructions and the hardware enclave may allow a remote party to run an unmodified program with confidentiality and/or integrity protection even if the rest of the system is malicious. Code and data stored in the hardware enclave may trust only the hardware enclave and may treat any process outside the hardware enclave, including an operating system or a hypervisor, as potentially hostile. The processor may encrypt information stored in the hardware enclave and decrypt the information on-the-fly within the processor itself.

Although hardware enclaves may provide opportunities to protect information from malicious systems (requiring trust only in the processor), a software developer may not utilize hardware enclaves because doing so requires that the software developer modify its programs. But the described systems and methods require little to no help from the developers of a program and do not require access to source code or rely on recompiling a program. Instead, the described system and methods may be applied directly to commercial off-the-shelf (COTS) program binaries by a person or entity other than the software developer. Thus, aspects of the described systems and methods may be provided as a service to software developers by a software distribution platform, an operating system developer, or other trusted parties. As a result, the described systems and methods may improve utilization of hardware enclaves to defeat piracy for both new and legacy software. Of course, a software developer may also perform aspects of the described systems and methods rather than rely on a third party.

Assume a software developer provides a COTS application to a platform to distribute and sell the application to consumers. The application may include one or more binaries that include executable code. In the case of a PC application, the application may include one or more EXE files and one or more DLL files. Each binary may include one or more code sections (sections of executable instructions) and one or more data sections containing information that the executable instructions reference and use. To run properly the binaries may require that the data sections be placed in memory at a predetermined and fixed distance from the code sections. The application or the binaries may define the predetermined and fixed distance.

Before making the application available to purchasers, the platform may modify each binary that includes executable code. The platform may modify each binary in up to three ways: (1) separate the code sections from the data sections; (2) encrypt the code sections, and (3) add a header.

First, for each binary file that includes executable code, the platform may separate the code sections from the data sections such that the code and the data can be loaded at two locations in memory that are an arbitrary distance apart (as opposed to the predetermined distance required before separation). Separating the code from the data may involve modifying all data references in the code that assume a fixed distance between the code and the data. The platform may separate the code from the data without relying on any information not included in the binaries. Thus, the platform may separate the code from the data without accessing source code or debug symbols of the binaries. Separating the code from the data may facilitate loading all code sections from multiple binaries adjacently into a single, continuous memory region.

Second, after the platform separates the code from the data, the platform may encrypt the code sections contained in each modified binary. The platform may leave the data sections of the binaries as unencrypted plain text.

Third, the platform may add a header or other information to one or more of the modified binaries. The header may communicate to an operating system that the code sections in the modified binaries have been separated from the data sections in the modified binaries. The header may also communicate that the code sections should be loaded into a hardware enclave and that the data sections should be loaded outside the hardware enclave.

After modifying the binaries, the platform may sell or distribute the application (with the modified binaries) to the public. A user may download the application to disk memory on a computing device that also includes a hardware enclave. When the user launches the application, an operating system of the computing device may load the binaries of the application into memory. The operating system may be designed to recognize when the code sections in the binaries are separate from the data sections. The operating system may also be designed to recognize when the code sections should be loaded into the hardware enclave. The operating system may determine, based on the header, that the code and data sections are separate and that the code sections should be loaded into the hardware enclave. After loading all the code sections from the modified binaries into the hardware enclave in one continuous range, the operating system may load all the data sections from the modified binaries into process memory outside of the hardware enclave.

To load the modified binaries in this way the operating system may include a loader that is different from a standard loader. A loader may be a part of the operating system designed to move executable files for an application from disk storage to process memory and to bootstrap the startup process for the application. A standard loader may load the code sections and the data sections into memory together and may not recognize information in the modified binaries indicating that the code sections should be loaded together. A loader included in the operating system described above, however, is designed to load the code sections of the modified binaries together in the hardware enclave and the data sections outside the hardware enclave. But even though the loader of the operating system described above may be different from a standard loader, the operating system kernel is not customized or changed. Therefore, the described systems and methods may require only minimal modifications to existing operating systems.

In addition to loading the modified binaries, the operating system may load startup code into the hardware enclave. The startup code may be included in the operating system and may not be encrypted. In the alternative, the platform may provide the startup code to the computing device with the application.

Once the loader has loaded everything, the operating system may transfer control to the startup code. The startup code may cause the processor to measure a hash of the code residing in the hardware enclave and sign the hash with a processor signature. The processor may then establish a secure communication channel with an authentication server of the platform and send the signed hash to the authentication server. The authentication server may verify the processor signature to ensure the processor is authentic. The authentication server may also verify the hash. If the authentication server verifies both the signature and the hash, the authentication server may send a key for decrypting the code to the computing device. The startup code may use the key to decrypt the code residing in the hardware enclave.

Before the application runs, the startup code may mark all hardware enclave memory as non-readable to code stored in the hardware enclave in order to protect the application from leaking code content. Otherwise, an attacker may try to trick an application to leak code content by manipulating data pointers that are not protected by the hardware enclave. The data sections stored outside the hardware enclave may contain pointers. An attacker may be able to change the pointers in the data sections to point to the code sections. If the code does not check whether the data is pointing to the code, the code may leak its contents if the hardware enclave were not marked as non-readable.

Notwithstanding the potential to combat software piracy, hardware enclaves have not been widely adopted. One reason, as noted above, may be that utilizing hardware enclaves requires software developers to modify existing software. Typically, a software developer must modify a program to make it aware of the hardware enclave to leverage capabilities of the hardware enclave. But the disclosed systems and methods do not require the software developer to modify a program. Nor do the disclosed systems and methods require that the software developer provide source code. Instead, the disclosed systems and methods allow a platform or service provider to modify the program to utilize the hardware enclave without requiring help or additional information from the software developer. In this way, the described systems and methods allow a software distribution platform to offer an end-to-end anti-piracy solution for third-party applications without relying on the software developers.

Another reason hardware enclaves may not have been widely adopted is a lack of support from major operating systems. But the described systems and methods preserve the compatibility with the commodity operating systems because they do not affect how operating systems access the program's data to service certain system calls (e.g., loading file content to a program's memory). The program's data still resides in the normal process memory, which is both readable and writable. Thus, the disclosed systems and methods do not require changes to today's operating system kernel. Instead, an operating system developer need only modify the operating system loader, making this approach amenable for real-world adoption on multiple platforms (e.g., Windows, Mac, etc.).

Another reason hardware enclaves may not have been widely adopted is the limited amount of enclave memory. The described systems and methods mitigate the memory pressure by using enclave memory for only a program's code sections, which are typically significantly smaller than a program's data sections. Moreover, software pirates may be more interested in application code rather than data.

FIG. 1 illustrates an example system 100 in which the techniques disclosed herein for protecting software from piracy may be utilized. The system 100 may include a platform 102, an authentication server 146, and a computing device 104. The platform 102 and the computing device 104 may be connected through a network 142. The computing device 104 and the authentication server 146 may also be connected through the network 142.

A software developer 106 may utilize the system 100. The software developer 106 may create a program 108a. The program 108a may be a set of instructions and information designed to perform one or more functions or tasks. The program 108a may be a commercial-off-the-shelf (COTS) software program that can be run on a computing device, such as the computing device 104.

The program 108a may include one or more files, such as file 110a and file 112a. The program 108a may include additional files not shown in FIG. 1. In other designs, the program 108a may include only one file. The files 110a, 112a may be unencrypted binary files. The files 110a, 112a may include executable code and data. Executable code may be instructions that a processor can understand and execute. The executable code in the files 110a, 112a may include references to the data included in the files 110a, 112a. The files 110a, 112a may be designed such that to run on a computing device, the data included in the files 110a, 112a must be stored at a fixed and predetermined distance in memory from the code included in the files 110a, 112a. The program 108a or the files 110a, 112a may define the fixed and predetermined distance.

The platform 102 may provide software programs for distribution and sale. The platform 102 may include an online store from which users can download software programs. The platform 102 may receive the program 108a from the software developer 106. The software developer 106 may provide the program 108a to the platform 102 for the purpose of having the platform 102 sell authorized copies of the program 108a to users of computing devices, such as the computing device 104. The software developer 106 may worry that someone may purchase the program 108a through the platform 102, make unauthorized copies of the program 108a, and then distribute the unauthorized copies to third parties without compensating the software developer 106. The platform 102 may provide a service to the software developer 106 to facilitate protecting the program 108a from software pirates.

The platform 102 may include a program 108b. The program 108b may be a modified version of the program 108a. The program 108b may include a modified file 110b and a modified file 112b. The modified file 110b may be a modified version of the file 110a, and the modified file 112b may be a modified version of the file 112a. The modified files 110b, 112b may be binary files. The platform 102 may have modified the program 108a to create the program 108b in order to facilitate protecting the program 108a from software piracy. In the alternative, the software developer 106 or an entity other than the platform 102 may modify the program 108a to create the program 108b.

The modified file 110b may include encrypted code 114b-1, encrypted code 114b-2, data 116b-1, data 116b-2, and a header 118b-1. The encrypted code 114b-1 and the encrypted code 114b-2 may be modified versions of the code included in the file 110a. The encrypted code 114b-1, 114b-2 may allow a computing device to execute the modified file 110b when the data 116b-1, 116b-2 are located at an arbitrary distance in memory from the encrypted code 114b-1, 114b-2. Furthermore, the encrypted code 114b-1, 114b-2 may be encrypted such that a key is required to decrypt and run the encrypted code 114b-1, 114b-2. Unlike the encrypted code 114b-1, 114b-2, the data 116b-1, 116b-2 may be unencrypted.

The header 118b-1 may include information about the modified file 110b. The header 118b-1 may indicate that the modified file 110b includes code and data that have been separated. In other words, the header 118b-1 may communicate that the data 116b-1, 116b-2 may be placed in memory at an arbitrary distance from the encrypted code 114b-1, 114b-2. The header 118b-1 may indicate that the encrypted code 114b-1, 114b-2 should be placed in a hardware enclave and the data 116b-1, 116b-2 should be placed in memory outside a hardware enclave. Although the header 118b-1 is shown in the modified file 110b, the information contained in the header 118b-1 may instead be included in the program 108b outside the modified file 110b.

The modified file 112b may include encrypted code 114b-3, data 116b-3, and a header 118b-2. The encrypted code 114b-2 may be a modified version of the code included in the file 112a. The encrypted code 114b-3 may allow a computing device to execute the modified file 112b when the data 116b-3 is stored an arbitrary distance in memory from the encrypted code 114b-3. Furthermore, the encrypted code 114b-3 may be encrypted. Unlike the encrypted code 114b-3, the data 116b-3 may be unencrypted.

The header 118b-2 may include information about the modified file 112b. The header 118b-2 may indicate that the modified file 112b includes code and data that have been separated. In other words, the header 118b-2 may communicate that the data 116b-3 may be placed in memory at an arbitrary distance from the encrypted code 114b-3. The header 118b-2 may indicate that the encrypted code 114b-3 should be placed in a hardware enclave and the data 116b-3 should be placed in memory outside a hardware enclave. Although the header 118b-2 is shown in the modified file 112b, the information contained in the header may instead be included in the program 108b outside the modified file 112b.

The computing device 104 may download software programs from the platform 102 for use on the computing device 104. A user of the computing device 104 may use downloaded software programs to perform functions and tasks. The computing device 104 may include a program 108c stored on disk storage 140. The program 108c may be a copy of the program 108b. The computing device 104 may have downloaded the program 108c from the platform 102 through the network 142.

The program 108c may include a modified file 110c and a modified file 112c. The modified file 110c may be a copy of the modified file 110b, and the modified file 112c may be a copy of the modified file 112b. The modified file 110c may include encrypted code 114c-1 (which may be a copy of the encrypted code 114b-1), encrypted code 114c-2 (which may be a copy of the encrypted code 114b-2), data 116c-1 (which may be a copy of the data 116b-1), data 116c-2 (which may be a copy of the data 116b-2), and a header 118c-1 (which may be a copy of the header 118b-1). The modified file 112c may include encrypted code 114c-3 (which may be a copy of the encrypted code 114b-3), data 116c-3 (which may be a copy of the data 116b-3), and a header 118c-2 (which may be a copy of the header 118b-2).

A user of the computing device 104 may cause the computing device 104 to initiate the program 108c. An operating system 126 of the computing device 104 may use a loader 128 to load the program 108c into memory 130 of the computing device. The operating system 126 may be a program that manages hardware and software on a computing device, such as the computing device 104. The platform 102 may have developed the operating system 126. The loader 128 may be designed to determine whether the modified files 110c, 112c include code that has been separated from data. The loader 128 may determine from the headers 118c-1, 118c-2 that the modified files 110c, 112c include code that has been separated from data.

The loader 128 may also determine from the headers 118c-1, 118c-2 that the code included in the modified files 110c, 112c should be loaded into a hardware enclave 132 of the memory 130. The hardware enclave 132 may be a defined portion of the memory 130 that has confidentiality and integrity protection from instructions not residing in the hardware enclave 132. A processor 136 of the computing device 104 may manage, protect, and support the hardware enclave 132.

The loader 128 may load the encrypted code 114c-1, 114c-2, 114c-3 into the hardware enclave 132. The loader 128 may load the encrypted code 114c-1, 114c-2, 114c-3 in a continuous range of the hardware enclave 132. The loader 128 may also load startup code 134 into the hardware enclave 132. The startup code 134 may be included in the operating system 126. In the alternative, the computing device 104 may obtain the startup code 134 from the platform 102 or as part of the program 108b. The startup code 134 may be unencrypted. The loader 128 may load the data 116c-1, 116c-2, 116c-3 into the memory 130 outside of the hardware enclave 132. The data 116c-1, 116c-2, 116c-3 may be located an arbitrary distance in the memory 130 from the encrypted code 114c-1, 114c-2, 114c-3.

Once the loader 128 has loaded the modified files 110c, 112c into the memory 130, the operating system 126 may initiate the startup code 134. The startup code 134 may include instructions to cause the processor to perform remote attestation in order to obtain a key to decrypt the encrypted code 114c-1, 114c-2, 114c-3, such as a decryption key 124. As part of performing remote attestation, the startup code 134 may include instructions to cause the processor 136 to provide information attesting to the authenticity of the contents of the hardware enclave 132. For example, the startup code 134 may include instructions to cause the processor 136 of the computing device 104 to measure a hash of the encrypted code 114c-1, 114c-2, 114c-3. The processor 136 may also include the startup code 134 in the hash measurement. The processor may use a public hash function to measure the hash of the encrypted code 114c-1, 114c-2, 114c-3 and the startup code 134.

As part of performing remote attestation, the processor 136 may provide information attesting to its authenticity. For example, the processor 136 may include a signature module 138, and the processor 136 may cause the signature module 138 to sign the hash with a processor signature. The signature module 138 may sign the hash using a private certificate maintained by the processor 136.

As part of performing remote attestation, the startup code 134 may cause the processor 136 to establish a communication channel with the authentication server 146 over the network 142. The communication channel may be a secure communication channel. The processor 136 may send information to the authentication server 146 attesting to the authenticity of the processor 136 and the contents of the hardware enclave 132. For example, the processor 136 may send the signed hash to the authentication server 146 over the communication channel. The processor 136 may send the signed hash to the authentication server 146 as part of a request for the decryption key 124. The decryption key 124 may enable decryption of the encrypted code 114b-1, 114b-2, 114b-3. In some designs, the authentication server 146 may be included in the platform 102. In other designs, the authentication server 146 may be separate from the platform 102. In that case, the authentication server 146 may have received the decryption key 124 from the platform 102.

The authentication server 146 may verify the processor signature received from the processor 136. The authentication server 146 may use a public certificate 148 to verify the processor signature. The authentication server 146 may verify the processor signature to determine that the processor 136 is authentic and can be trusted. If the authentication server 146 cannot verify the processor signature, the processor 136 may be malicious or controlled by an attacker. In that case, the processor 136 may not have placed the encrypted code 114b-1, 114b-2, 114b-3 in a secure hardware enclave. When the authentication server 146 cannot verify the processor signature, the authentication server 146 may not provide the decryption key 124 to the computing device 104. Otherwise, a user of the computing device 104 may be able to cause the computing device 104 to place the encrypted code 114b-1, 114b-2, 114b-3 in a non-secure portion of the memory 130, use the decryption key 124 to decrypt the encrypted code 114b-1, 114b-2, 114b-3, and make unauthorized copies of the decrypted code.

The authentication server 146 may verify the hash. The authentication server 146 may include a verified hash value 150. The authentication server 146 may determine whether the hash received from the processor 136 matches the verified hash value 150. The platform 102 may have determined the verified hash value 150 when the platform 102 generated the modified files 110b, 112b. The platform 102 may have had access to the startup code 134 to generate the verified hash value 150. The authentication server 146 may verify the hash to determine that the computing device 104 has not modified the encrypted code 114b-1, 114b-2, 114b-3 or the startup code 134. If the authentication server 146 cannot verify the hash, the authentication server 146 may not provide the decryption key 124 to the computing device. Otherwise, a user of the computing device 104 may be able to modify the startup code 134 or the encrypted code 114b-1, 114b-2, 114b-3 to include instructions to provide information about the decrypted contents of the hardware enclave 132. By verifying the hash, the system 100 may protect the program 108a from a malicious loader. Even if the loader 128 is malicious, the loader 128 cannot pirate the encrypted code 114b-1, 114b-2, 114b-3 because it is encrypted. And even if the loader 128 injects additional information into the encrypted code 114b-1, 114b-2, 114b-3 or loads the encrypted code 114b-1, 114b-2, 114b-3 incorrectly, the authentication server 146 will not verify the hash.

If the authentication server verifies that the processor 136 and the contents of the hardware enclave 132 can be trusted (such as by verifying both the processor signature and the hash), the authentication server 146 may send the decryption key 124 to the computing device 104. The processor 136 may use the decryption key 124 to decrypt the encrypted code 114b-1, 114b-2, 114b-3. At that time, the hardware enclave 132 may contain decrypted code 120-1, 120-2, 120-3. The decrypted code 120-1 may be a decrypted version of the encrypted code 114c-1. The decrypted code 120-2 may be a decrypted version of the encrypted code 114c-2. The decrypted code 120-3 may be a decrypted version of the encrypted code 114c-3. The decrypted code 120-1, 120-2 can be executed even when the decrypted code 120-1, 120-2 is an arbitrary distance in the memory 130 from the data 116c-1, 116c-2. And the decrypted code 120-3 can be executed even when the decrypted code 120-3 is an arbitrary distance in the memory 130 from the data 116c-3.

Before the processor 136 executes the decrypted code 120-1, 120-2, 120-3, the startup code 134 may cause the processor 136 to mark the hardware enclave 132 as non-readable to all instructions residing inside the hardware enclave 132. The startup code 134 may include these instructions in order to protect the decrypted code 120-1, 120-2, 120-3 from leaking content. Readability and executability may be two separate permissions. Therefore, marking the hardware enclave 132 as non-readable may not prevent the decrypted code 120-1, 120-2, 120-3 from being executed. Once the processor 136 marks the hardware enclave 132 as non-readable, the processor 136 may execute the decrypted code 120-1, 120-2, 120-3. The decrypted code 120-1, 120-2, 120-3 may perform the same functions as the code included in the files 110a, 112a.

Figure 2B:
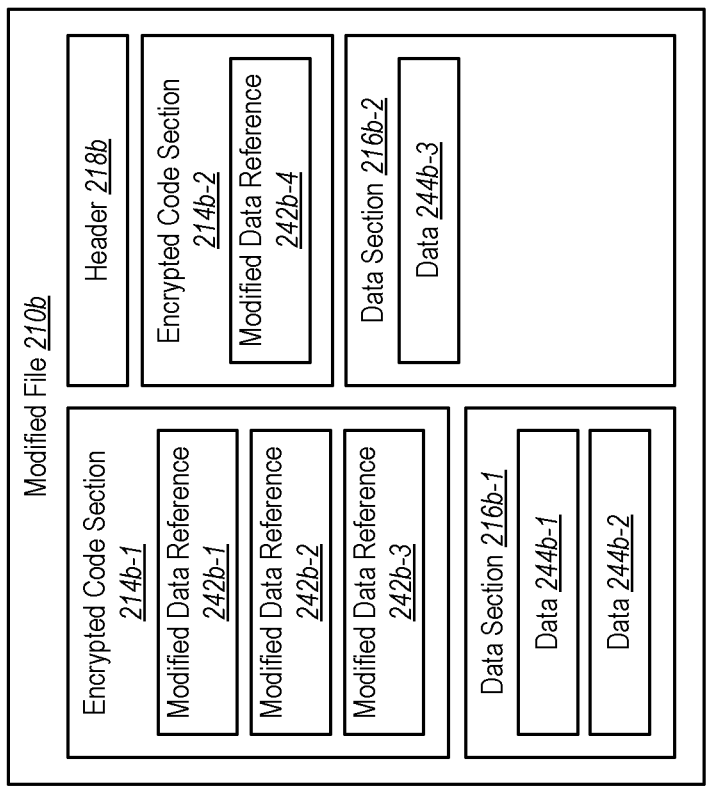
FIGS. 2A and 2B illustrate an example file that may be modified in a way to facilitate protecting the example file from software piracy.
Figure 2A:
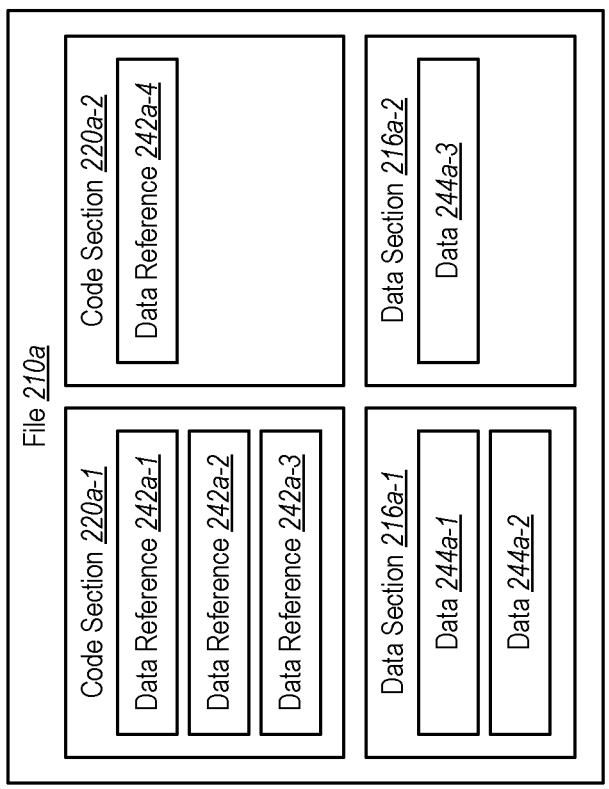

FIGS. 2A and 2B illustrate a file 210a and a modified file 210b in accordance with the techniques described herein. The file 210a may be one example of the file 110a shown in FIG. 1. The modified file 210b may be one example of the modified file 110b shown in FIG. 1.

The file 210a may be part of a COTS software program. The file 210a may be an unencrypted binary file that includes executable code and data. For example, the file 210a may include a code section 220a-1, a code section 220a-2, a data section 216a-1, and a data section 216a-2. The code sections 220a-1, 220a-2 may include executable code and may be unencrypted. The code sections 220a-1, 220a-2 may be much smaller in size than the data sections 216a-1, 216a-2. The code sections 220a-1, 220a-2 may include one or more references to the data sections 216a-1, 216a-2. For example, the code section 220a-1 may include data reference 242a-1, data reference 242a-2, and data reference 242a-3, and the code section 220a-2 may include data reference 242a-4. Although the file 210a includes two code sections and two data sections, in other embodiments a file may contain only one code section and one data section or more than two code sections and more than two data sections. A file may also contain an unequal number of code sections and data sections.

The data references 242a-1, 242a-2, 242a-3, 242a-4 may point to specific data or specific locations in the data sections 216a-1, 216a-2. For example, the data reference 242a-1 may point to data 244a-1 in the data section 216a-1. The data reference 242a-2 may point to data 244a-2. The data reference 242a-3 may point to data 244a-3 in the data section 216a-2. The data reference 242a-4 may also point to the data 244a-3. The data references 242a-1, 242a-2, 242a-3, 242a-4 may be formatted such that the data references 242a-1, 242a-2, 242a-3, 242a-4 will point to the correct data during runtime only if the data sections 216a-1, 216a-2 are loaded in memory at a fixed and predetermined distance from the code sections 220a-1, 220a-2. The data references 242a-1, 242a-2, 242a-3, 242a-4 may include instructions to obtain specific data included in the data section 216a-1 or the data section 216a-2. The data references 242a-1, 242a-2, 242a-3, 242a-4 may include instructions to modify specific data included in the data section 216a-1 or the data section 216a-2. Thus, if the data sections 216a-1, 216a-2 are not loaded at the fixed and predetermined distance from the code sections 220a-1, 220a-2, instructions included in the code sections 220a-1, 220a-2 may obtain or modify the wrong data, and the file 210a may not function properly.

The modified file 210b may be a modified version of the file 210a. A developer of the file 210a may modify the file 210a to generate the modified file 210b. In the alternative, a person or entity other than the developer of the file 210a (such as a platform) may modify the file 210a to generate the modified file 210b. A person or entity other than the developer of the file 210a may create the modified file 210b without access to source code of the file 210a or debug symbols of the file 210a.

The modified file 210b may include encrypted code section 214b-1, encrypted code section 214b-2, data section 216b-1, and data section 216b-2. The encrypted code sections 214b-1, 214b-2 may be modified versions of the code sections 220a-1, 220a-2. The encrypted code sections 214b-1, 214b-2 may be encrypted such that a computing device cannot execute the encrypted code sections 214b-1, 214b-2 without first obtaining a decryption key. The data sections 216b-1, 216b-2 may be copies of the data sections 216a-1, 216a-2. The data sections 216b-1, 216b-2 may include data 244b-1 (which may be a copy of data 244a-1), data 244b-2 (which may be a copy of data 244a-2), and data 244b-3 (which may be a copy of data 244a-3). The data sections 216b-1, 216b-2 may be unencrypted plain text.

The encrypted code section 214b-1 may include modified data reference 242b-1, modified data reference 242b-2, and modified data reference 242b-3. The encrypted code section 214b-2 may include modified data reference 242b-4. The modified data reference 242b-1 may be a modified version of the data reference 242a-1. The modified data reference 242b-2 may be a modified version of the data reference 242a-2. The modified data reference 242b-3 may be a modified version of the data reference 242a-3. The modified data reference 242b-4 may be a modified version of the data reference 242a-4. The modified data references 242b-1, 242b-2, 242b-3, 242b-4 may be modified such that the modified data references 242b-1, 242b-2, 242b-3, 242b-4 will point to the correct data during runtime even if the distance in memory between the encrypted code sections 214b-1, 214b-2 and the data sections 216b-1, 216b-2 is different from a fixed and predetermined distance, which may be defined in the file 210a. For example, if the data reference 242a-1 points to the data 244a-1 when the data section 216a-1 is placed at a fixed and predetermined distance in memory from the code section 220a-1, the modified data reference 242b-1 will point to the data 244b-1 when the data section 216b-1 is placed at a distance in memory from the code section 214b-1 that is different from the fixed and predetermined distance. Thus, the modified data references 242b-1, 242b-2, 242b-3, 242b-4 are designed such that there can be an arbitrary distance in memory between the encrypted code sections 214b-1, 214b-2 and the data sections 216b-1, 216b-2.

Modifying the data references 242a-1, 242a-2, 242a-3, 242a-4 may involve identifying and locating the data references 242*a*-1, 242*a*-2, 242*a*-3, 242*a*-4 within the code sections 220*a*-1, 220*a*-2. Locating the data references 242*a*-1, 242*a*-2, 242*a*-3, 242*a*-4 may involve use of relocation information. The file 210*a* or a program that includes the file 210*a* may include relocation information about all data references within the code sections. The relocation information may be included to support Address Space Layout Randomization (ASLR). ASLR may allow a processor to load a program into an arbitrary place in memory. But ASLR may still require that the distance between code and data be the fixed distance defined in the program. Nevertheless, ASLR may help a platform locate the data references 242*a*-1, 242*a*-2, 242*a*-3, 242*a*-4. Thus, the platform may leverage the relocation information to locate data references 242*a*-1, 242*a*-2, 242*a*-3, 242*a*-4. After locating the data references 242*a*-1, 242*a*-2, 242*a*-3, 242*a*-4, the platform may modify the data references 242*a*-1, 242*a*-2, 242*a*-3, 242*a*-4 to separate the code sections 220*a*-1, 220*a*-2 from the data sections 216*a*-1, 216*a*-2.

The modified file 210*b* may include a header 218*b*. The header 218*b* may include information about the modified file 210*b*. The header 218*b* may be unencrypted. The header 218*b* may indicate that the encrypted code sections 214*b*-1, 214*b*-2 have been separated from the data sections 216*b*-1, 216*b*-2 such that the data sections 216*b*-1, 216*b*-2 can be loaded in memory at an arbitrary distance from the code sections 214*b*-1, 214*b*-2. The header 218*b* may indicate that the code sections 214*b*-1, 214*b*-2 should be loaded into a hardware enclave and the data sections 216*b*-1, 216*b*-2 should be loaded in memory outside the hardware enclave. The platform may add the header 218*b* to the modified file 210*b*.

Figure 3:
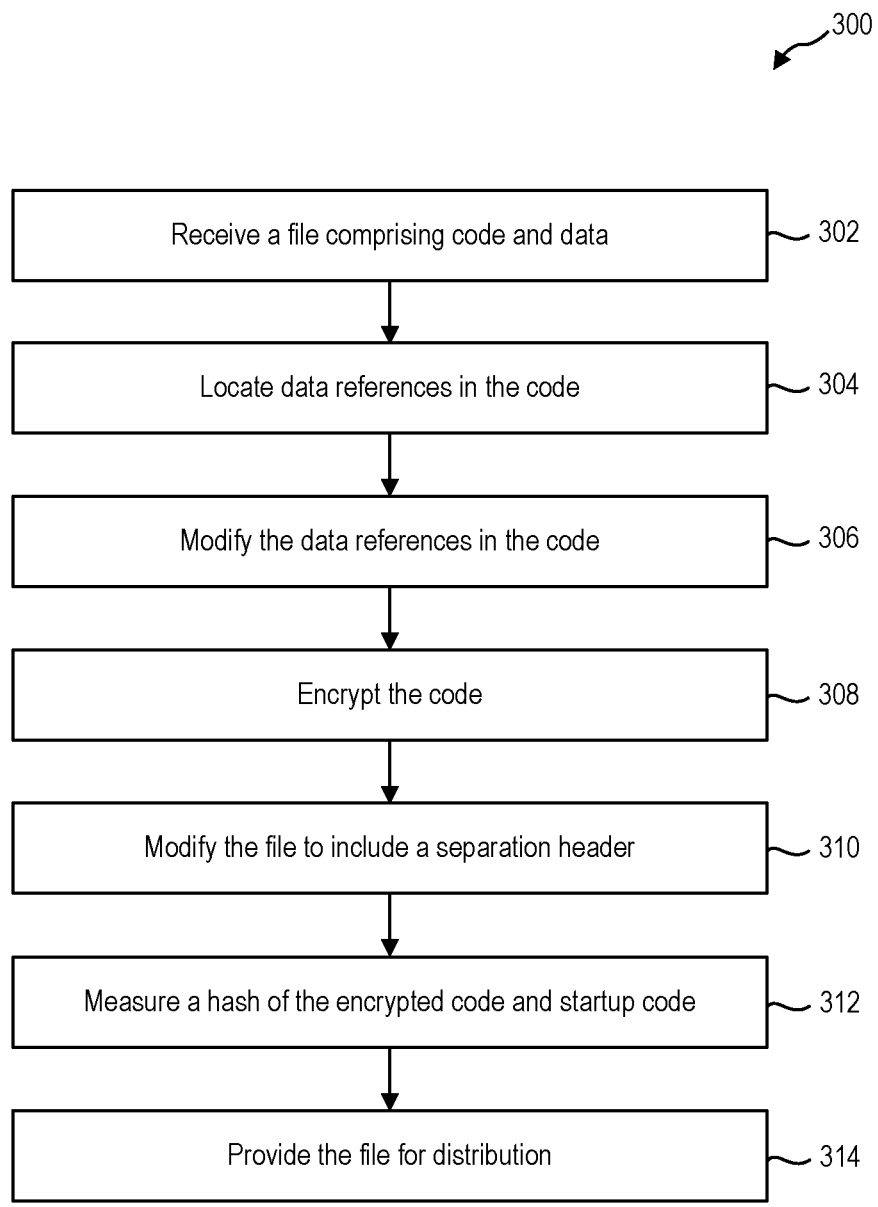
FIG. 3 illustrates an example method for modifying a file to facilitate protecting the file from software piracy.

FIG. 3 illustrates an example method 300 for modifying a file to facilitate protecting a program from piracy using a hardware enclave.

The method 300 may include receiving 302 a file comprising code and data. The file may be part of a program, which may be a COTS software product. The file may be the file 110*a*, the file 112*a*, or the file 210*a*. The program may include additional information other than the file. The file may be an executable file. The file may be an unencrypted binary file. The code may be instructions executable by a processor. The file may be designed such that the data must be stored at a fixed and predetermined distance in memory from the code in order for the file to execute properly. A platform, such as the platform 102, may receive 302 the file.

The method 300 may include locating 304 data references in the code. The data references may point to specific information or locations in the data. The code may use the data references as part of obtaining or modifying specific information in the data. The data references may be designed such that the data must be stored at a fixed, predetermined distance in memory from the code in order for the data references to point to the correct information in the data during runtime. The platform may locate 304 the data references. The platform may locate 304 the data references without using source code or debug symbols associated with the file. The platform may locate 304 the data references without using information from a developer of the program other than the program.

Locating 304 the data references in the code may include using relocation information about the data references contained in the code, the file, or the program. The relocation information may be included to support ASLR.

The method 300 may include modifying 306 the data references in the code. Modifying 306 the data references may include separating the code from the data. When separated, the data can be placed at an arbitrary distance in memory from the code and the data references in the code will still point to the correct information in the data during runtime. The platform may modify 306 the data references. The platform may modify 306 the data references without accessing source code or debug symbols associated with the file. The platform may modify 306 the data references without accessing information from a developer of the program other than the program.

The method 300 may include encrypting 308 the code. Decrypting the encrypted code may require use of a decryption key. The decryption key may be a private decryption key. The platform may encrypt 308 the code. The platform may not encrypt the data.

The method 300 may include modifying 310 the file to include a separation header. The separation header may indicate that the data in the file can be placed at an arbitrary distance in memory from the code. The separation header may indicate that the code should be loaded in memory inside a hardware enclave and that the data should be loaded in the memory outside the hardware enclave. The platform may modify 310 the file to include the separation header.

The method 300 may include measuring 312 a hash of the encrypted code and startup code. Measuring 312 the hash may include performing a public, standard hash function on the encrypted code and the startup code. The startup code may be designed to be placed in the hardware enclave with the encrypted code. Measuring 312 the hash may include storing the hash as a verified hash value. The platform may measure 312 the hash. The platform may store the hash on the platform or on an authentication server. The hash may be used in authenticating a request for a decryption key to decrypt the encrypted code.

The method 300 may include providing 314 the file for distribution. The file may include the separation header, the modified data references, and the encrypted code. Providing 314 the file for distribution may include providing copies of the file for users to download. The platform may provide 314 the file for distribution. A computing device may download the file from the platform.

Figure 4:
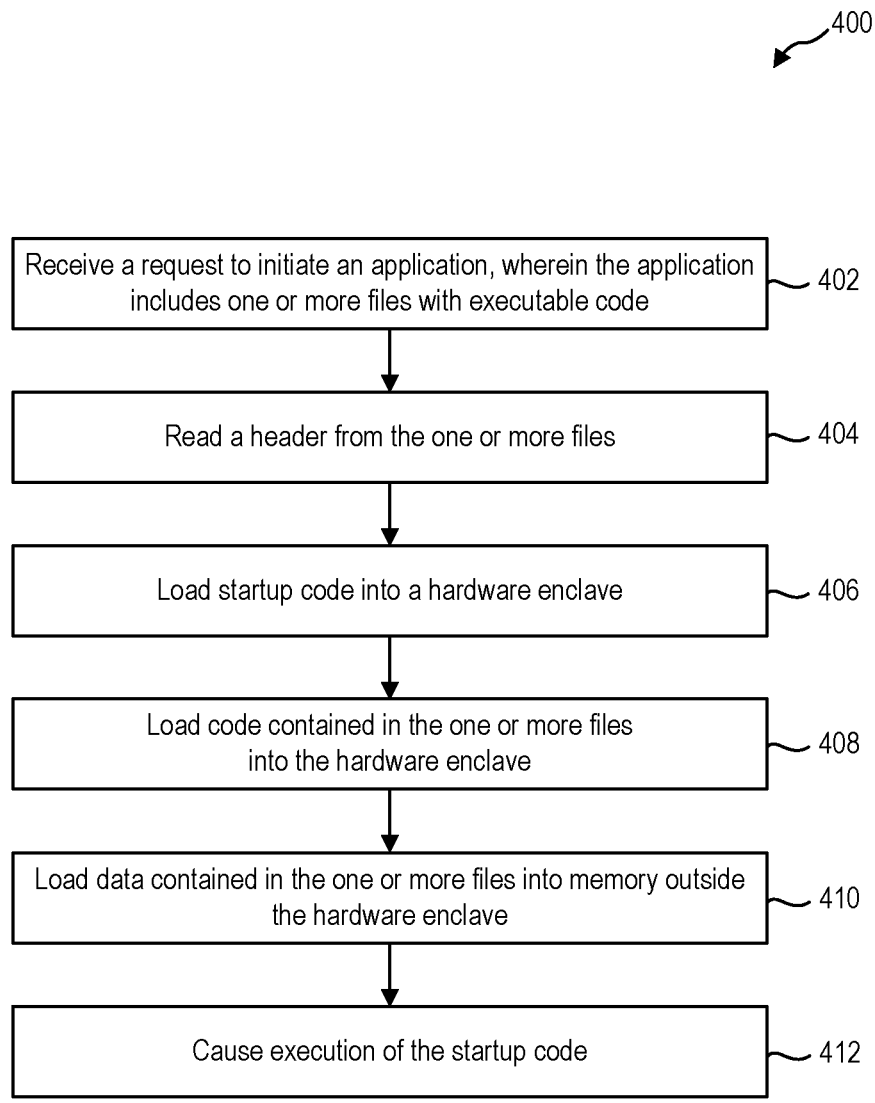
FIG. 4 illustrates an example method for loading a file into memory to facilitate protecting the file from software piracy.

FIG. 4 illustrates a potential method 400 for loading an application to facilitate protecting the application from software piracy.

The method 400 may include receiving 402 a request to initiate an application. The application may include one or more files with executable code. Each of the one or more files may include both code and data. The code and the data in the one or more files may have been separated such that the data from each of the one or more files can be loaded at an arbitrary distance in memory from the code of that file. The code in the one or more files may be encrypted. The data in the one or more files may be unencrypted. An operating system, such as the operating system 126, may receive 402 the request.

The method 400 may include reading 404 a header from the one or more files. The header may be contained in or associated with the one or more files. The header may indicate that the code and the data in the one or more files are separated. The header may indicate that the code should be loaded in a hardware enclave in a continuous range and the data should be loaded in memory outside the hardware enclave. The operating system may read 404 the header. The operating system may include a loader, such as the loader 128, designed to read and understand the header.

The method 400 may include loading 406 startup code into a hardware enclave. The startup code may include instructions consumable by a processor. The startup code may include instructions to cause a processor to measure a hash of information stored in the hardware enclave, sign the hash with a signature, provide the hash and the signature to an authentication server, and mark the hardware enclave as non-readable. The operating system may load 406 the startup code into the hardware enclave. The operating system may include the startup code. In the alternative, the operating system may receive the startup code from a platform.

The method 400 may include loading 408 code contained in the one or more files into the hardware enclave. The code may be encrypted. Loading 408 the code may include loading the code in a continuous range in the hardware enclave. The operating system may load 408 the code contained in the one or more files into the hardware enclave. The operating system may use a loader to load 408 the code contained in the one or more files into the hardware enclave.

The method 400 may include loading 410 data contained in the one or more files into memory outside the hardware enclave. The data may not be encrypted. Loading 410 the data may include loading the data in a continuous range in memory outside the hardware enclave. Loading 410 the data may include loading the data at an arbitrary distance in the memory from the code. The operating system may load 410 the data contained in the one or more files into memory outside the hardware enclave. The operating system may use the loader to load 410 the data.

The method 400 may include causing 412 execution of the startup code. The operating system may cause 412 execution of the startup code. The startup code may be unencrypted.

Figure 5:
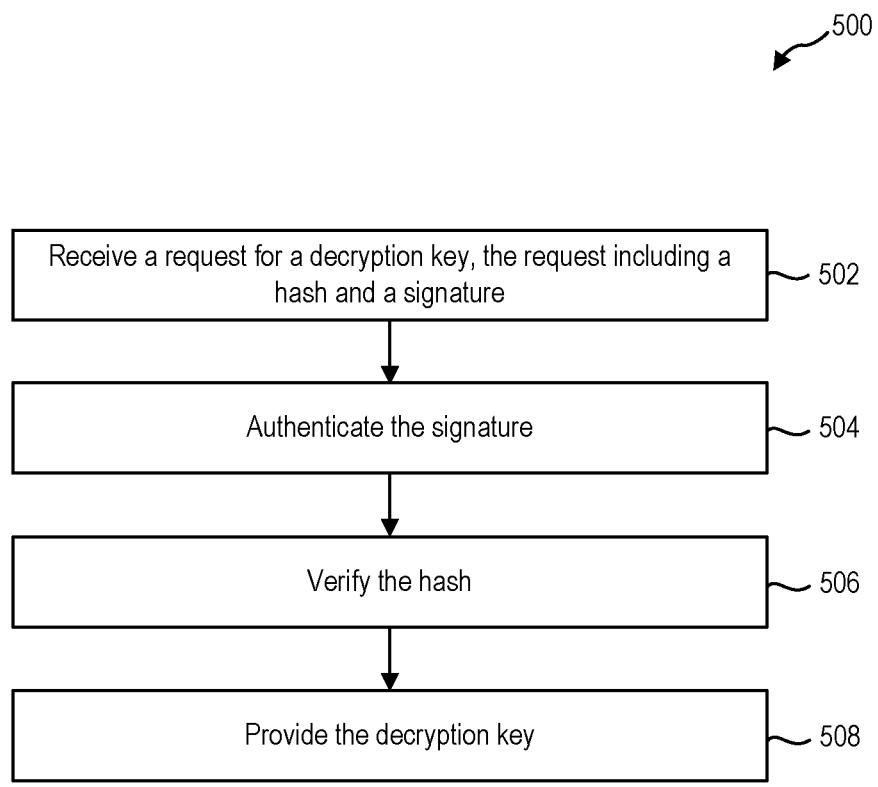
FIG. 5 illustrates an example method for authenticating information and providing a decryption key to facilitate protecting a file from software piracy.

FIG. 5 illustrates an example method for providing a decryption key in accordance with the techniques described herein.

The method 500 may include receiving 502 a request for a decryption key, the request including a hash and a signature. A computing device may make the request and may provide the hash and the signature. The computing device may make the request as part of a remote attestation process. The computing device may include a processor and a hardware enclave. The hardware enclave may include encrypted code and startup code. The processor may have measured the hash of the encrypted code and the startup code. The processor may have signed the hash with the signature using a private certificate. A platform or an authentication server may receive 502 the request.

The method 500 may include authenticating 504 the signature. Authenticating 504 the signature may include determining that the hash was signed using the private certificate. Authenticating 504 the signature may be done using a public certificate. The platform or the authentication server may authenticate 504 the signature. Authenticating 504 the signature may verify that the processor is authentic and can be trusted to enforce the confidentiality and/or integrity protections of the hardware enclave.

The method 500 may include verifying 506 the hash. Verifying 506 the hash may include comparing the hash to a verified hash value. The platform or the authentication server may verify 506 the hash. Verifying 506 the hash may verify that the encrypted code and the startup code stored in the hardware enclave have not been modified by the computing device. Verifying 506 the hash may verify that the encrypted code and the startup code can be trusted. The platform or the authentication server may have determined the verified hash value.

The method 500 may include providing 508 the decryption key. The decryption key may allow the computing device to decrypt the encrypted code. The startup code may include instructions to cause the processor to decrypt the encrypted code. The platform or the authentication server may provide 508 the decryption key. The platform or the authentication server may not provide 508 the decryption key unless the signature is authentic and the hash matches the verified hash value. If the signature or the hash is not verified or validated, the platform or the authentication server may notify the computing device that the platform or the authentication server will not provide the decryption key.

Figure 6:
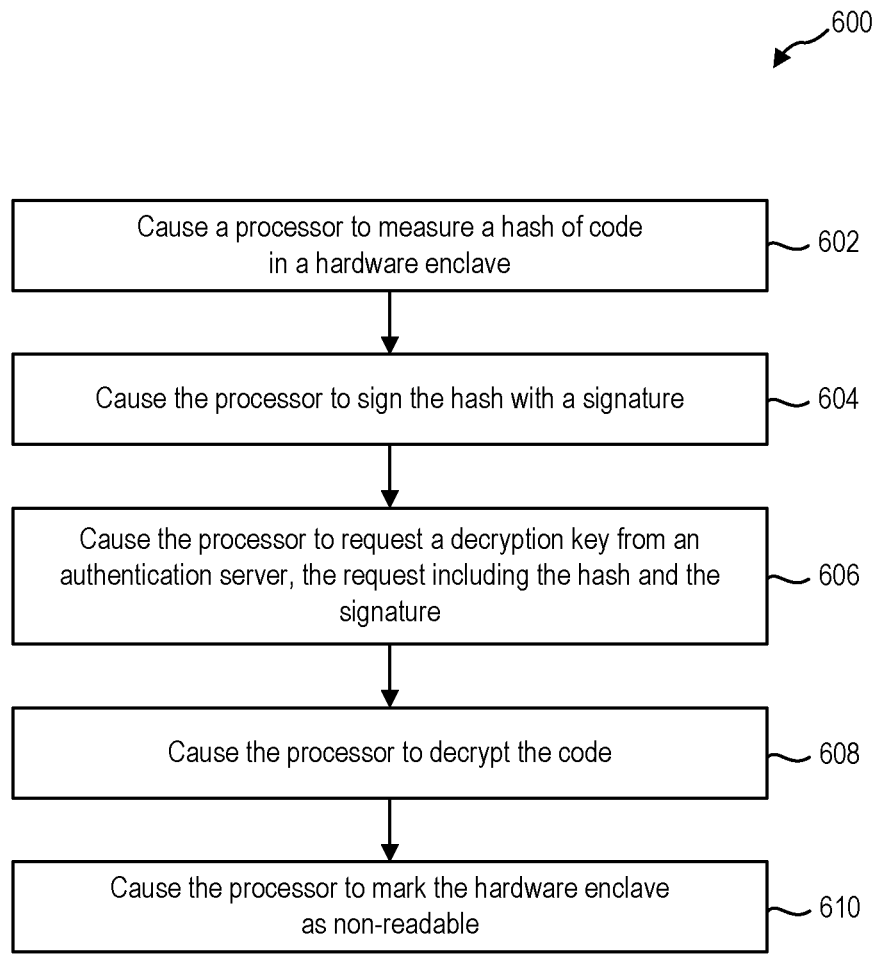
FIG. 6 illustrates an example method for initiating execution of a program to facilitate protecting the program from software piracy.

FIG. 6 illustrates an example method 600 for initiating a program modified in accordance with the techniques disclosed herein.

The method 600 may include causing 602 a processor to measure a hash of code in a hardware enclave. Startup code stored in the hardware enclave may include instructions to cause 602 the processor to measure the hash of the code in the hardware enclave. The processor may measure the hash of the code in the hardware enclave using a standard hash function. The code in the hardware enclave may include startup code and encrypted code from a program. The program may include files whose code sections and data sections have been separated. Measuring the hash of the code in the hardware enclave may be part of a remote attestation process to obtain a decryption key. Other methods for attesting to the contents of the hardware enclave may be used other than measuring the hash.

The method 600 may include causing 604 the processor to sign the hash with a signature. The startup code may include instructions to cause 604 the processor to sign the hash with the signature. The processor may sign the hash with the signature using a private certificate. Signing the hash with the signature may be part of the remote attestation process for obtaining the decryption key. Other methods for attesting to the authenticity of the processor may be used other than signing the hash with the signature.

The method 600 may include causing 606 the processor to request a decryption key from an authentication server, the request including the hash and the signature. The startup code may include instructions to cause 606 the processor to request the decryption key. The processor may make the request and provide the hash and the signature to the authentication server over a secure communication channel. The authentication server may be part of a platform. The authentication server may include the decryption key. The authentication server may provide the decryption key if the authentication server verifies the hash and the signature. If the authentication server determines either that the signature is not authentic or that the hash is incorrect, the authentication server may not provide the decryption key. Although the method 600 includes causing 606 the processor to request the decryption key using the hash and the signature, other attestation methods may be used.

The method 600 may include causing 608 the processor to decrypt the code. The startup code may include instructions to cause 608 the processor to use the decryption key to decrypt the code.

The method 600 may include causing 610 the processor to mark the hardware enclave as non-readable. The startup code may include instructions to cause 610 the processor to mark the hardware enclave as non-readable to instructions within the hardware enclave.

Figure 7:
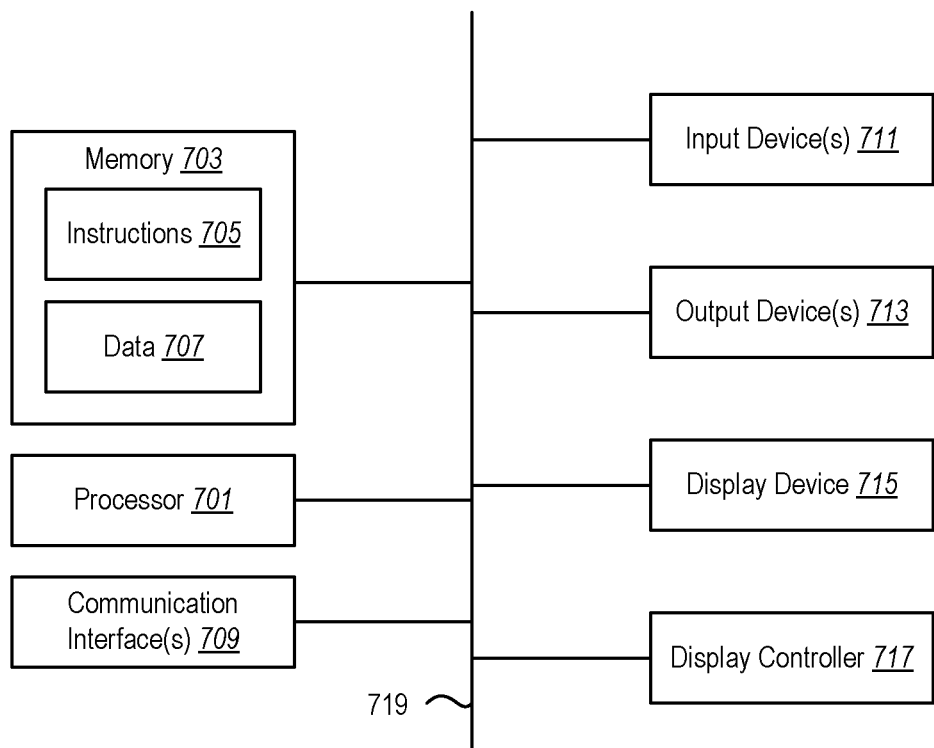
FIG. 7 illustrates certain components that may be included in a computing system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules, components, packages, applications, and operating systems described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for protecting software from piracy, the method comprising:
   receiving multiple binary files, each binary file comprising code and data, wherein the code of each binary file includes a reference to the data of that binary file and the reference requires a fixed distance between the code and the data;
   modifying the multiple binary files such that the data of each binary file may be located at an arbitrary distance in memory from the code of that binary file;
   encrypting the code of each binary file; and
   receiving, from a computing device, a request for a decryption key, wherein the computing device includes a hardware enclave, wherein the hardware enclave comprises a defined region of memory of the computing device configured to protect the hardware enclave from instructions residing outside the hardware enclave, wherein the encrypted code of each binary file is stored in the hardware enclave, and wherein the data of each binary file is stored outside of the hardware enclave.

2. The method of claim 1 further comprising: providing, to the computing device, the decryption key.

3. The method of claim 2 further comprising: authenticating, before providing the decryption key, a processor signature, wherein a processor of the computing device generated the processor signature and the request for the decryption key includes the processor signature.

4. The method of claim 3 further comprising: validating, before providing the decryption key, a hash, wherein the request for the decryption key includes the hash.

5. The method of claim 1, wherein modifying the multiple binary files includes modifying data references in the code of each binary file that require that the data be placed a fixed distance in memory from the code.

6. The method of claim 5, wherein modifying the multiple binary files is done without access to source code or debug symbols for the multiple binary files.

7. The method of claim 1 further comprising: adding a separation header to each of the multiple binary files, wherein the separation header indicates that the data of each of the multiple binary files may be placed at the arbitrary distance in the memory from the code of that binary file.

8. A system for facilitating protecting a software program from piracy, comprising:
   one or more processors;
   system memory in electronic communication with the one or more processors; and
   instructions stored in the system memory, the instructions being executable by the one or more processors to:
     receive multiple binary files, each binary file comprising code and data, wherein the code of each binary file includes a reference to the data of that binary file, and wherein the reference is designed such that the data must be stored at a fixed, predetermined distance in memory from the code;
     modify the multiple binary files such that the data of each binary file may be located at an arbitrary distance in the memory from the code of that binary file;
     encrypt the code of each binary file but not the data of each binary file; and
     receive, from a computing device, a request for a decryption key, wherein the computing device includes a hardware enclave, wherein the encrypted code of each binary file is stored in the hardware enclave, wherein the data of each binary file is stored outside of the hardware enclave, wherein the hardware enclave includes instructions to mark the hardware enclave as non-readable before executing the code, and wherein the hardware enclave comprises a defined region of memory of the computing device configured with confidentiality and integrity protection from other instructions residing outside of the hardware enclave.

9. The system of claim 8, the instructions further being executable by the one or more processors to: provide, to the computing device, the decryption key.

10. The system of claim 9, the instructions further being executable by the one or more processors to: authenticate, before providing the decryption key, a processor signature, wherein a processor of the computing device generated the processor signature and the request for the decryption key includes the processor signature.

11. The system of claim 10, the instructions further being executable by the one or more processors to: validate, before providing the decryption key, a hash, wherein the request for the decryption key includes the hash and validating the hash comprises comparing the hash to a verified hash value.

12. The system of claim 8, wherein modifying the multiple binary files includes identifying data references in the code of each binary files and modifying the data references.

13. The system of claim 12, wherein modifying the multiple binary files does not require access to source code or debug symbols for the multiple binary files.

14. The system of claim 8, the instructions further being executable by the one or more processors to: add a separation header to each of the multiple binary files, wherein the separation header indicates that the data of each of the multiple binary files may be placed at the arbitrary distance in the memory from the code of that binary file and that the code of that binary file should be placed in the hardware enclave.

15. A non-transitory computer-readable medium comprising instructions that are executable by one or more processors to cause a computing system to:
   receive a request to initiate an application, the application comprising one or more files with executable code and data, wherein the executable code is encrypted;
   load the executable code into a hardware enclave on the computing system;
   load the data into a location in memory on the computing system, wherein the location is outside the hardware enclave and is not a predetermined distance in the memory on the computing system from the executable code, wherein the hardware enclave comprises a defined region of the memory and only software stored in the hardware enclave can read or save contents of the hardware enclave;
   send a request for a decryption key to an authentication server;
   decrypt the executable code using the decryption key, wherein the decryption key is received by the computing system after sending the request for the decryption key; and
   mark the hardware enclave as non-readable.

16. The non-transitory computer-readable medium of claim 15, wherein the executable code comprises two or more sections of executable code and the two or more sections of executable code are loaded in a continuous range in the hardware enclave.

17. The non-transitory computer-readable medium of claim 15, further comprising additional instructions that are executable by the one or more processors to cause the computing system to: load startup code into the hardware enclave.

18. The non-transitory computer-readable medium of claim 17, further comprising additional instructions that are executable by the one or more processors to cause the computing system to: measure a hash of the startup code and the executable code.

19. The non-transitory computer-readable medium of claim 18, further comprising additional instructions that are executable by the one or more processors to cause the computing system to: sign the hash with a signature of the one or more processors.

20. The non-transitory computer-readable medium of claim 19, wherein the request for the decryption key includes the signature and the hash.

\* \* \* \* \*